(12) United States Patent
Fulton et al.

(10) Patent No.: US 12,556,119 B2
(45) Date of Patent: Feb. 17, 2026

(54) CIRCUIT FOR CONTROLLING PEAK BRUSH EXCITATION VOLTAGE

(71) Applicant: BorgWarner Inc., Auburn Hills, MI (US)

(72) Inventors: Dave A. Fulton, Anderson, IN (US); Cong Ma, Fishers, IN (US); Eric Strauss, Fishers, IN (US)

(73) Assignee: BORGWARNER INC., Auburn Hills, MI (US)

( * ) Notice: Subject to any disclaimer, the term of this patent is extended or adjusted under 35 U.S.C. 154(b) by 189 days.

(21) Appl. No.: 18/442,670

(22) Filed: Feb. 15, 2024

(65) Prior Publication Data

US 2024/0275319 A1    Aug. 15, 2024

Related U.S. Application Data

(60) Provisional application No. 63/445,862, filed on Feb. 15, 2023.

(51) Int. Cl.
*H02P 21/18* (2016.01)
*H02P 23/00* (2016.01)

(52) U.S. Cl.
CPC .................. *H02P 23/00* (2013.01)

(58) Field of Classification Search
CPC .......... H02P 23/00; H02P 9/14; H02P 25/022; H02M 1/0009; H02M 7/48
See application file for complete search history.

(56) References Cited

U.S. PATENT DOCUMENTS

| | | | |
|---|---|---|---|
| 2012/0229055 A1 | 9/2012 | Sugiura et al. | |
| 2013/0069566 A1 | 3/2013 | Pietromonaco | |
| 2022/0248529 A1* | 8/2022 | Sato | H05K 1/189 |

FOREIGN PATENT DOCUMENTS

| | | |
|---|---|---|
| CN | 2100056 U | 3/1992 |
| EP | 2717433 A1 | 4/2014 |
| JP | 6951008 B1 | 9/2021 |

OTHER PUBLICATIONS

International Search Report for International Application No. PCT/US2024/015962, International Filing Date Feb. 15, 2024, Date of Mailing Jun. 12, 2024, 4 pages.
Written Opinion for International Application No. PCT/US2024/015962, International Filing Date Feb. 15, 2024, Date of Mailing Jun. 12, 2024, 4 pages.

* cited by examiner

*Primary Examiner* — Muhammad S Islam
(74) *Attorney, Agent, or Firm* — CANTOR COLBURN LLP

(57) ABSTRACT

Embodiments of the disclosure provide a control circuit operable to control voltage delivery to a multi-component load. The control circuit is electronically coupled to a first component of the multi-component load. The control circuit is further electronically coupled to a second component of the multi-component load. The control circuit is operable to, responsive to an output voltage of a source, generate a second component voltage and provide the second component voltage to the second component of the multi-component load. A peak value of the second component voltage is less than the output voltage.

20 Claims, 7 Drawing Sheets

CIRCUIT FOR CONTROLLING PEAK BRUSH EXCITATION VOLTAGE

CROSS REFERENCE TO RELATED APPLICATIONS

This application claims the benefit of an earlier filing date from U.S. Provisional Application Ser. No. 63/445,862 filed Feb. 15, 2023, the entire disclosure of which is incorporated herein by reference.

BACKGROUND OF THE INVENTION

The present disclosure relates in general to circuitry for controlling the voltage applied to a load. More specifically, the present disclosure relates to a control circuit operable to control or reduce the peak voltage supplied to a brush excitation system of a motor.

The terms "electric machine" refer generally to machines that use electromagnetic forces, such as electric motors, electric generators, and the like. Electric machines function as electromechanical energy converters. For example, an electric motor converts electricity to mechanical power while an electric generator converts mechanical power to electricity. The moving parts in an electric machine can be rotating (rotating machines) or linear (linear machines).

An electric motor is an electrical machine that operates through the interaction between the motor's magnetic field and electric current in a wire winding to generate force in the form of torque applied on the motor's shaft. An electric generator is mechanically identical to an electric motor, but operates in reverse, converting mechanical energy into electrical energy. Electric motors can be powered by direct current (DC) sources, such as from batteries or rectifiers, or by alternating current (AC) sources, such as a power grid, inverters or electrical generators. Electric motors can be classified by considerations such as power source type, construction, application and type of motion output. More specifically, electric motors can be brushed or brushless; single-phase; two-phase or three-phase; axial or radial flux; and air-cooled or liquid-cooled.

A traction motor is an electric motor used for propulsion of a vehicle, such as locomotives, electric vehicles, hydrogen vehicles, and/or electric multiple unit trains. Traction motors are used in electrically powered railway vehicles (electric multiple units) and other electric vehicles, including, for example, electric milk floats, trolleybuses, elevators, roller coasters, and conveyor systems, as well as vehicles with electrical transmission systems (diesel-electric locomotives, electric hybrid vehicles), and battery electric vehicles.

An example configuration for a traction motor is a so-called wound rotor motor, which has a rotor and a stator. The stator is the fixed part. The rotor is the rotating part. The stator usually has a standard three-phase winding, and the rotor is made with a field winding. The field winding is connected to slip rings to which power is supplied through brushes. The brushes are in contact with the slip ring and supply power from the voltage bus to the rotor coil via the slip rings. Traction motors typically operate on a 400V or an 800V bus that supplies the bus voltage to the stator windings and to the rotor windings (or field coils).

As brushes wear, brush dust will form and could collect into tracks, which could cause a short between the brushes, the slip rings, or from the brushes to ground. However, voltages that exceed a certain level (e.g., above about 400V) can create problems at the brushes in that a relatively large voltage differential will occur between the negative brush and the positive brush, and this relatively large voltage differential increases an amount of conductive brush dust that is generated and deposited over rotor elements. The combination of an increased presence of conductive brush dust with the relatively large voltage differential between positive/negative brushes increases the possibility of creating unwanted arc currents that pass through the air between the negative brush and the positive brush. This unwanted arc current is referred to as a "carbon tracking" and can cause short circuits.

Typical motor designs provide distances or clearance between components (e.g., positive/negative brushes) that can result in arcing. However, the previously-described high voltage differential and increased conductive brush dust can place pressure on motor designs to provide even greater design clearances/distances, which can increase the space requirements of the motor to levels that are unacceptable for a given motor application. In some situations, the previously-described high voltage differential and increased conductive brush dust can overcome design clearances/distances to still generate unwanted arcing. This process of overcoming design clearances/distances to create unwanted arcing and resultant electrical shorts is referred to as "creepage." and "clearance" issues. In general, carbon tracking problems, creepage problems, and clearance requirements/problems increase as the voltage applied to the brushes and slip ring increases.

For some motor applications, it is desirable to provide power to the motor from a relatively high voltage bus (e.g., about 800V). Accordingly, there is a need for systems that source motor drive voltages from a relatively high voltage bus (e.g., about 800V) without the above-described carbon tracking problems, creepage problems, and clearance requirements/problems, which typically increase as the voltage applied to brushes and slip rings of the rotor component increases.

BRIEF DESCRIPTION OF THE INVENTION

Embodiments of the disclosure provide a control circuit operable to control voltage delivery to a multi-component load. The control circuit is electronically coupled to a first component of the multi-component load. The control circuit is further electronically coupled to a second component of the multi-component load. The control circuit is operable to, responsive to an output voltage of a source, generate a second component voltage and provide the second component voltage to the second component of the multi-component load. A peak value of the second component voltage is less than the output voltage.

Embodiments of the disclosure further provide a control circuit operable to control voltage delivery to a motor. The control circuit includes a first control circuit stage and a second control circuit stage. The first control circuit stage is operable to generate a first pulsed voltage and provide the first pulsed voltage to a stator component of the motor. The second control circuit stage is operable to generate a second pulsed voltage and provide the second pulsed voltage to a brush excitation system of a rotor component of the motor. A peak value of the second pulsed voltage is less than a peak value of the first pulsed voltage. Additionally, the peak value of the second pulsed voltage does not exceed a maximum peak voltage rating of an insulation system of the brush excitation system of the rotor component of the motor.

Embodiments of the disclosure further provide a method of making a control circuit operable to control voltage delivery to a multi-component load. The method includes forming a first control circuit stage operable to generate a first voltage and provide the first voltage to a first component of the multi-component load. The method further includes forming a second control circuit stage operable to generate a second voltage and provide the second voltage to a second component of the multi-component load. A peak value of the second voltage is less than a peak value of the first voltage.

Figure 1:
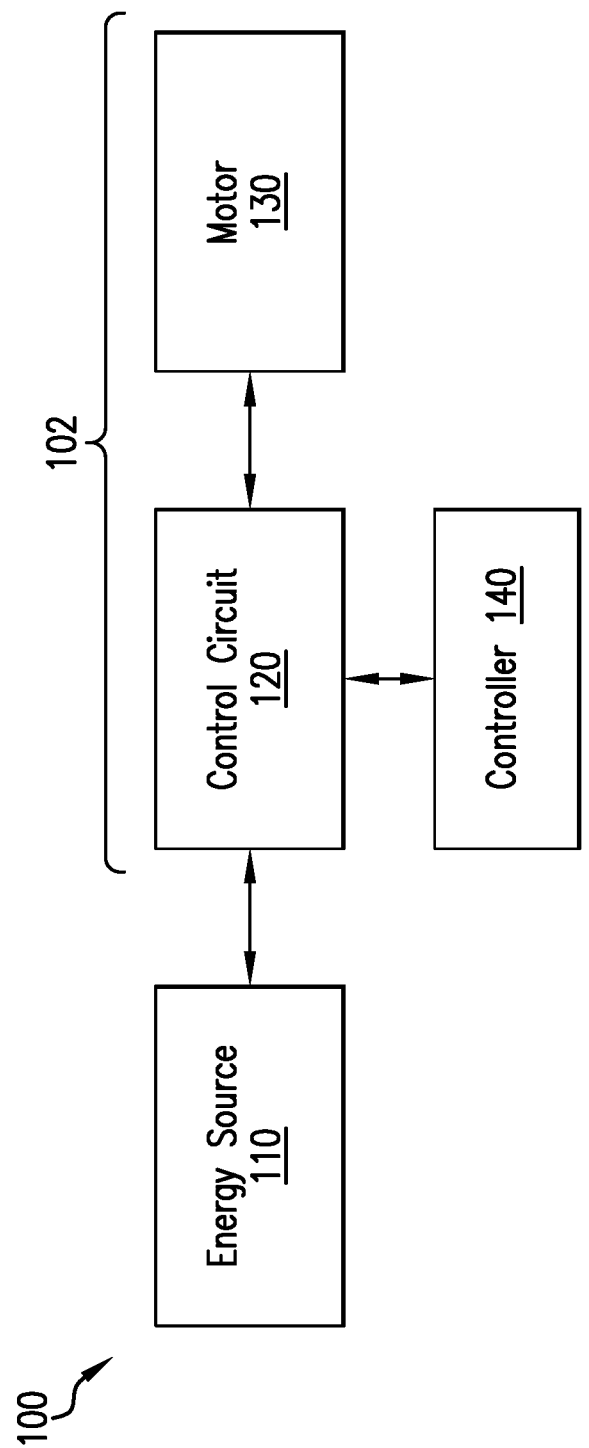
FIG. 1 is a simplified block diagram illustrating a non-limiting example of an electric drive motor system in accordance with aspects of the disclosure.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION OF THE INVENTION

Embodiments of the disclosure provide a novel control circuit operable to control or reduce the peak voltage supplied to a brush excitation system of a motor. The novel control circuit addresses carbon tracking problems, creepage problems, and clearance requirements/problems that result from supplying power to a motor from a high voltage bus (e.g., at or above about 800V). The novel control circuit is operable to provide a peak voltage of the high voltage bus to the stator component of the motor but provide a reduced peak voltage (i.e., a voltage that is less than the highest voltage available on the high voltage bus) to the brush excitation system (brushes and rotor coils) of the rotor component of the motor. In some embodiments of the disclosure, the reduced peak voltage is selected such that it is does not exceed a maximum peak voltage rating of an insulation system of the brush excitation system of the rotor component of the motor.

In some embodiments of the disclosure, the control circuit includes a voltage step-down stage operable to generate the reduced peak voltage by stepping down the highest voltage available on the high voltage bus to the reduced peak voltage. In some embodiments of the disclosure, the control circuit further includes a DC-DC converter stage operable to generate from the reduced peak voltage a pulsed version of the reduced peak voltage having a controllable duty cycle and a controllable average voltage over time. The controllable duty cycle and/or the controllable average voltage over time can be controlled by the control circuit to provide the duty cycle and average voltage over time as required by the tasks being performed by the motor.

The novel control circuit is operable to provide a peak voltage (e.g., about 800V) from the high voltage bus to the stator component of the motor, but provides a reduced peak voltage (i.e., a voltage that is less than the highest voltage available on the high voltage bus) to the brush excitation system (brushes and rotor coils) of the rotor component of the motor. In some embodiments of the disclosure, the reduced peak voltage is generated by configuring the high bus voltage such that it is coupled to a multi-component energy source (e.g., a multi-cell battery) having multiple cells that combine to place the high voltage on the voltage bus. Under this scenario, the control circuit can access the reduced peak voltage by accessing (e.g., through the voltage bus or the directly from the multi-component energy source) a number of cells in the multi-component energy source that provide the desired reduced peak voltage. Under this scenario, the control circuit uses a DC-DC converter stage operable to generate from the reduced peak voltage a pulsed version of the reduced peak voltage having a controllable duty cycle and a controllable average voltage over time. The controllable duty cycle and/or the controllable average voltage over time can be controlled by the control circuit to provide the duty cycle and average voltage over time as required by the tasks being performed by the motor.

In accordance with embodiments of the disclosure, because the insulating systems of the stator can tolerate high voltages (e.g., at or above about 800V) without damaging the motor or impairing motor function, the novel control circuit is operable to provide the high voltage (e.g., at or above about 800V) pulled from the high voltage bus to an inverter circuit stage of the control circuit, which generates a pulsed voltage that is provided to the stator windings to generate a 3-phase alternating current (AC). However, because the insulating systems of the rotor cannot tolerate high voltages (e.g., at or above about 800V) without the previously-described "carbon tracking," "creepage," and "clearance" issues, the novel control circuit generates a reduced peak voltage that is pulsed (e.g., buy a DC-DC converter) and provided to the rotor. In accordance with aspects of the disclosure, the reduced peak voltage is set such that existing and tested rotor, brush, slip ring, and insulating system designs can be used with a high voltage bus and high voltage energy source without the need to create rotor, brush, slip ring, and insulating system designs that can tolerate the same high peak voltages (e.g., at or above about 800V) that are provided through the control circuit inverter stage to the stator.

In some embodiments of the disclosure, the control circuit can be configured to include a single relatively large DC-DC converter operable to generate one or more instances of a reduced peak voltage and provide the one or more instances of the reduced peak voltage to both the stator component of the motor and the wound rotor component of the motor. However, embodiments of the disclosure that implement the control circuit as the above-described single relatively large DC-DC converter would have much higher converter cost, size, and loss (therefore lower system efficiency) than the previously-described embodiments of the disclosure where the control circuit provides a peak voltage of the high voltage bus to the stator component of the motor but provide a reduced peak voltage (i.e., a voltage that is less than the highest voltage available on the high voltage bus) to the brush excitation system (brushes and rotor coils) of the rotor component of the motor. More specifically, a typical wound rotor traction motor uses a relatively low (e.g., about 5 kW) maximum rotor power, and uses a relatively higher (e.g., at or above about 200 kW) maximum stator and 3-phase inverter power. Accordingly, embodiments of the disclosure that focus on only providing a reduced voltage to the rotor windings allows the added upstream voltage converter to be sized for only about 5 kW rather than a 200+ kW converter that provides 400V to both the rotor and stator.

Turning now to a more detailed description of embodiments of the disclosure, FIG. 1 depicts a system 100 embodying aspects of the disclosure. The system 100 includes an energy source 110 electronically coupled to an electric motor drive system 102. In the embodiment depicted in FIG. 1, the electric motor drive system 102 includes a control circuit 120, an electric motor 130, and a controller 140, configured and arranged as shown. Although the control circuit 120, the electric motor 130, and the controller 140 are depicted as separate components, it is understood that the control circuit 120, the electric motor 130, and the controller 140 can be combined in any suitable combination. For example, the controller 140 can be incorporated within the control circuit 120; portions of the control circuit 120 can be incorporated within the electric motor 130; and/or the control circuit 120 and the controller 140 can be incorporated within the electric motor 130.

The energy source 110 can be implemented in a variety of forms, including, for example as a battery. In some embodiments, the battery can be a battery pack having a set of one or more individual battery cells connected in series or in parallel and that operate under the control of one or more controllers, such as a battery control module (BCM) that monitors and controls the performance of the battery pack. The BCM can monitor several battery pack level characteristics such as pack current measured by a current sensor, pack voltage, and pack temperature, for example. The battery pack can be recharged by an external power source (not shown). The battery pack can include power conversion electronics operable to condition the power from the external power source to provide the proper voltage and current levels to the battery pack. The individual battery cells within a battery pack can be constructed from a variety of chemical formulations. Battery pack chemistries can include, but are not limited, to lead acid, nickel cadmium (NiCd), nickel-metal hydride (NIMH), lithium-ion or lithium-ion polymer.

The electric motor 130 can be any electric motor design that is suitable for the work to be performed by the motor. Examples of work that can be done by motors in conventional automobile-based motor applications include operating or moving power windows; power seats; fans for the heater and the radiator; windshield wipers; and/or the engine of a vehicle having a hybrid-electric or pure-electric vehicle configuration. Regardless of the type of the electric motor 130, it relies on electromagnetism and moving magnetic fields to generate mechanical power. The electric motor 130 can be powered by DC sources, such as from batteries or rectifiers, and/or by AC sources, such as a power grid, inverters or electrical generators. The electric motor 130 can be classified by considerations such as power source type, construction, application and type of motion output.

In some embodiments of the disclosure, the electric motor 130 can be a traction motor used for propulsion of a vehicle, such as locomotives, electric vehicles, hydrogen vehicles, and/or electric multiple unit trains. Traction motors are used in electrically powered railway vehicles (electric multiple units) and other electric vehicles, including, for example, electric milk floats, trolleybuses, elevators, roller coasters, and conveyor systems, as well as vehicles with electrical transmission systems (diesel-electric locomotives, electric hybrid vehicles), and battery electric vehicles.

The control circuit 120 is electrically coupled between the energy source 110 and the electric motor 130 to transfer energy from the energy source 110 to the electric motor 130. In some embodiments of the disclosure, energy is transferred from the energy source 110 over an energy/voltage bus coupled to the energy source 110 and other components of the electric drive system 102 that require power. Embodiments of the disclosure use the concepts of current, voltage, and power. In general, voltage and current are the cornerstone concepts in electricity. In order to clarify what is meant by "current," it is necessary to first describe the concept of "charge." The concept of electricity arises from an observation of a force between objects, that, like gravity, acts at a distance. The source of this force has been given the name charge. Opposite types of charge attract, and like types of charge repel. Charge flows in a current, and current is reported as the number of charges per unit time passing through a boundary. A positive sign is assigned to current corresponding to the direction a positive charge would be moving. Because electrons are free to move about in metals, moving electrons are what makes up the current in metals.

Voltage, also called electromotive force, is a quantitative expression of the potential difference in charge between two points in an electrical field. The greater the voltage, the greater the flow of electrical current (i.e., the quantity of charge carriers that pass a fixed point per unit of time) through a conducting or semiconducting medium for a given resistance to the flow. The standard unit to measure voltage is the volt, symbolized by a non-italic uppercase letter V. One volt will drive one coulomb ($6.24 \times 10^{18}$) charge carriers, such as electrons, through a resistance of one ohm in one second. Voltage can be direct or alternating. A direct voltage maintains the same polarity at all times. In an alternating voltage, the polarity reverses direction periodically. The number of complete cycles per second is the frequency, which is measured in hertz (one cycle per second), kilohertz, megahertz, gigahertz, or terahertz. An example of direct voltage is the potential difference between the terminals of an electrochemical cell. Alternating voltage exists between the terminals of a common utility outlet. A voltage produces an electrostatic field, even if no charge carriers move (i.e., no current flows). As the voltage increases between two points separated by a specific distance, the electrostatic field becomes more intense.

Power is what happens when voltage and current act together. Electric power is defined as the electrical energy transferred in a circuit per unit of time. The unit of electric power is the Watt (W) and is denoted by the symbol P. It is often measured in kilowatts (kW), where 1 kW=1000 W. The electrical power used by an electrical component depends on two main factors, namely, the current I passing through the component, along with the potential difference or voltage across the two ends of the component. Increasing either current or voltage will increase the power proportionally. The electric power transferred to an electrical component in a circuit can be calculated using the electric power formula $P=VI$, where P is the electric power, V is the potential difference across the component, and I is the current passing through the component. The electric power can also be calculated by knowing the current and resistance using the equation $P=I^2R$, where R is the resistance of the electrical component.

The controller 140 is operable to assist the control circuit 120 in providing the various forms of voltages (e.g., pulsed voltages, duty cycles, averages voltages, and the like) that are applied to the components (e.g., rotor and/or stator) of the motor 130. In embodiments of the disclosure, the controller can include some for all of the features and functionality of the computing system 600 (shown in FIG. 6).

Figure 2:
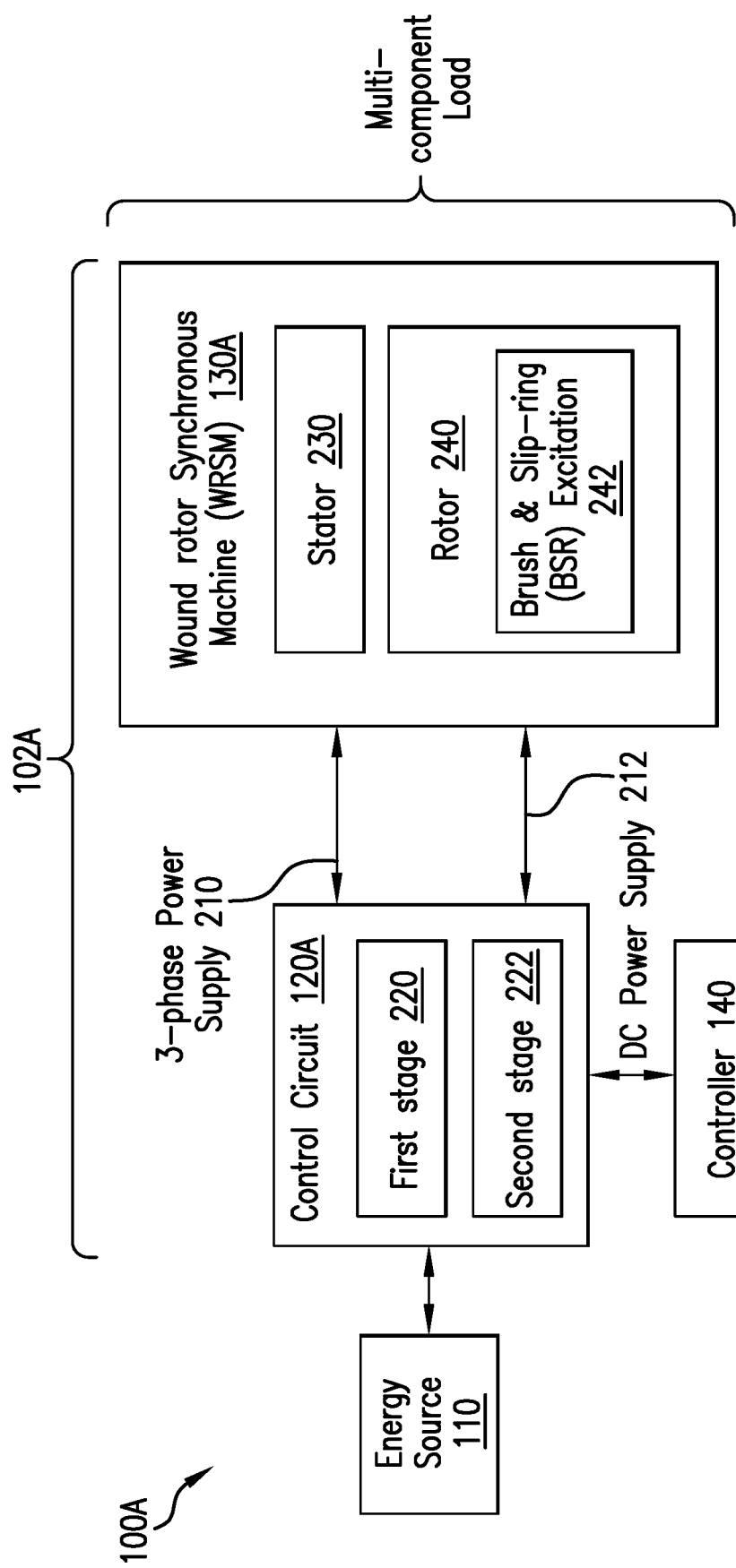
FIG. 2 is a simplified block diagram illustrating a non-limiting example of an electric drive motor system in accordance with aspects of the disclosure.

FIG. 2 depicts a system 100A embodying aspects of the disclosure. The system 100A represents a more detailed example of how the system 100 (shown in FIG. 1) can be implemented in accordance with aspects of the disclosure. The system 100A includes the energy source 110 electronically coupled to an electric motor drive system 102A. In embodiments of the disclosure, the electric motor drive system 102A includes a control circuit 120A, a wound rotor synchronous machine (WRSM) 130A, and the controller 140, configured and arranged as shown. The control circuit 120A includes a first stage 220 and a second stage 222; and the WRSM 130A includes a stator 230 and a rotor 240. The rotor 240 further includes a brush & slip ring (BSR) excitation system 242. Although not depicted separately, the stator 230 includes a stator insulation system, and the rotor 240 includes a rotor insulation system. The stator/rotor insulation systems include various types and configurations of insulation materials designed and assembled to withstand the challenges of different environments where the stator/rotor 230/240 are deployed, and to shield the stator/rotor 230/240 and their associated systems from potential dangers like short circuits or electrical faults. Although the control circuit 120A, the WRSM 130A, and the controller 140 are depicted as separate components, it is understood that the control circuit 120A, the WRSM 130A, and the controller 140 can be combined in any suitable combination. For example, the controller 140 can be incorporated within the control circuit 120A; portions of the control circuit 120A can be incorporated within the WRSM 130A; and/or the control circuit 120A and the controller 140 can be incorporated within the motor 130A.

In accordance with embodiments of the disclosure, the WRSM 130A is a non-limiting example of a multi-component load, where a first component of the multi-component load is the stator 230, and where a second component of the multi-component load is the rotor 240. The control circuit 120A is operable to control voltage delivery from a voltage bus associated with the energy source 110 to the WRSM 130A. More specifically, the first control circuit stage 220 is operable to, responsive to accessing an output voltage of the energy source 110 (e.g., via a voltage bus), generate a first voltage in the form of a 3-phase power supply 210 and provide the first voltage to the stator 230 of the WRSM 130A. Additionally, the second control circuit stage 222 is operable to, responsive to accessing another output voltage of the energy source 110 (e.g., via a voltage bus), generate a second voltage in the form of a DC power supply 212 and provide the second voltage to the rotor 242 (and more specifically to the BSR excitation 242) of the WRSM 130A. In accordance with aspects of the disclosure, the first stage 220 and the second stage 222 are configured and arranged such that a peak value of the second voltage (e.g., the DC power supply 212) is less than a peak value of the first voltage (e.g., the 3-phase power supply 210).

In addition to any one or more of the features and embodiments described herein, the peak value of the second voltage (e.g., the DC power supply 212) can be configured and arrange to not exceed a maximum peak voltage rating of the insulation system of the rotor 240 of the WRSM 130A. In addition to any one or more of the features and embodiments described herein, the first control circuit stage 220 can be configured and arranged to include an inverter circuit (e.g., inverter 310 shown in FIGS. 3A and 3B).

In addition to any one or more of the features and embodiments described herein, the second control circuit stage 222 can be configured and arranged to include a voltage step-down circuit (e.g., Converter 1 shown in FIG. 3A) operable to generate reduced peak voltage (e.g., at or less than about 400V) from a high voltage output (e.g., from about 400V to about 800V or greater) of the energy source 110. In addition to any one or more of the features and embodiments described herein, the second control circuit stage 222 can be further configured and arranged to include a DC-DC converter circuit (e.g., Converter 2 shown in FIG. 3A) operable to generate a pulsed voltage having the reduced peak voltage.

In addition to any one or more of the features and embodiments described herein, the second voltage (e.g., the DC power supply 212) is a reduced peak voltage (i.e., a voltage that is less than the highest voltage available on the high voltage bus) to the BSR excitation system 242 of the rotor 240. In some embodiments of the disclosure, the reduced peak voltage is generated by configuring the high bus voltage such that it is coupled to a multi-component implementation of the energy source 110 (e.g., a multi-cell battery) having multiple cells that combine to place the high voltage on the voltage bus. Under this scenario, the second stage 222 of the control circuit 120A can access the reduced peak voltage by accessing (e.g., through the voltage bus or the directly from the multi-component energy source) a number of cells in the multi-component energy source that provide the desired reduced peak voltage. Under this scenario, the second control circuit stage 222 can be configured and arrange to use a DC-DC converter stage (e.g., Converter shown in FIG. 3B) operable to generate from the reduced peak voltage a pulsed version of the reduced peak voltage (e.g., $V_f(t)$ shown in FIG. 5B) having a controllable duty cycle (e.g., Duty-cycle2 shown in FIG. 5B) and a controllable average voltage over time (e.g., Vavg shown in FIG. 5B). The controllable duty cycle and/or the controllable average voltage over time can be controlled by the control circuit 120A to provide the duty cycle and average voltage over time as required by the tasks being performed by the WRSM 130A.

Figure 3A:
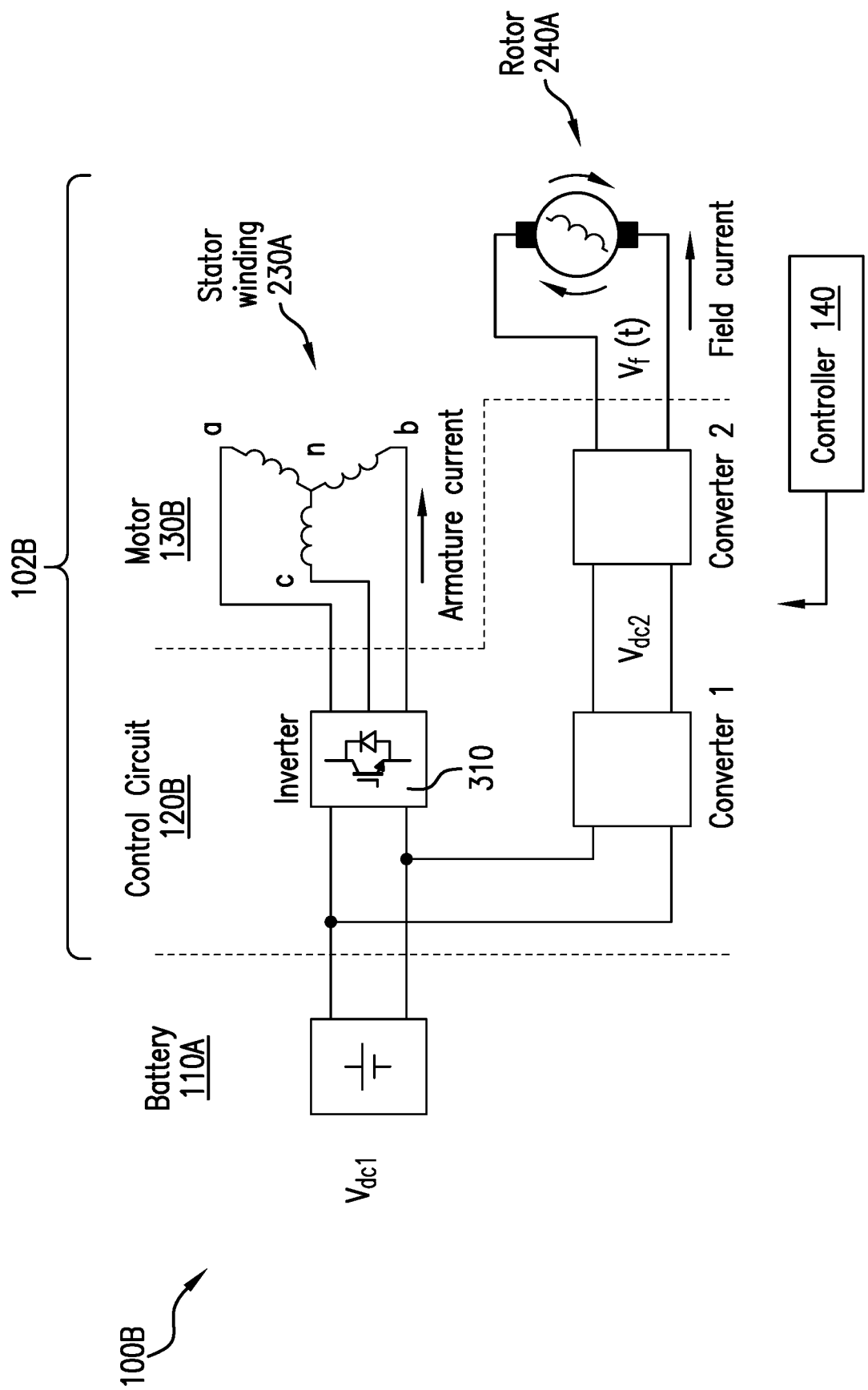
FIG. 3A is a simplified block diagram illustrating a non-limiting example of an electric drive motor system in accordance with aspects of the disclosure.

FIG. 3A depicts a system 100B embodying aspects of the disclosure. The system 100B represents a more detailed example of how the systems 100, 100A (shown in FIGS. 1 and 2) can be implemented in accordance with aspects of the disclosure. The system 100B includes a battery 110A, electronically coupled to an electric motor drive system 102B. In embodiments of the disclosure, the electric motor drive system 102B includes a control circuit 120B, a motor 130B, and the controller 140, configured and arranged as shown. The control circuit 120B includes a first stage implemented as an inverter 310, along with a second stage implemented as Converter 1 and Converter 2. The motor 130B includes a stator having stator windings 230A and a rotor 240A. The rotor 240A further includes a BSR excitation system (corresponding to the BSR excitation system 242 shown in FIG. 2). Although not depicted separately, the stator windings 230A include a stator insulation system, and the rotor 240A includes a rotor insulation system. The stator/rotor insulation systems include various types and configurations of insulation materials designed and assembled to withstand the challenges of different environments where the stator/rotor 230A/240A are deployed, and to shield the stator/rotor 230A/240A and their associated systems from potential dangers like short circuits or electrical faults. Although the control circuit 120B, the motor 130B, and the controller 140 are depicted as separate components, it is understood that the control circuit 120B, the motor 130B, and the controller 140 can be combined in any suitable combination. For example, the controller 140 can be incorporated within the control circuit 120B; portions of the control circuit 120B can be incorporated within the motor 130B; and/or the control circuit 120B and the controller 140 can be incorporated within the motor 130B.

In embodiments of the disclosure, the battery 110A generates an output voltage Vdc1, which can be a relatively high voltage (e.g., above about 400V to about 800V and above). In embodiments of the disclosure, Vdc1 has a value that does not exceed a maximum voltage rating of the insulation systems of the stator 230, 230A. However, that same value of Vdc1 exceeds a maximum voltage rating of the insulation system of the rotor 240, 240A. In embodiments of the disclosure, the inverter 310 is a 3-phase inverter and operable to convert Vdc1 of the battery 110A to a 3-phase power supply (e.g., 3-phase power supply 212 shown in FIG. 2) as required by the 3-phases (Phase neutral-to-a; Phase neutral-to-b; and Phase neutral-to-c) of the stator windings 230A of the motor 130B in order to function. In embodiments of the disclosure, the 3-phase inverter 310 can be a 3-phase full-bridge inverter having six switches organized as three "phase legs." Each phase leg can include two switches connected in series and between a positive DC rail and a negative DC rail. At any given moment, up to three of the control circuit switches conduct while the other three control circuit switches are open. A phase node can be positioned between the two switches of each phase leg to provide the three phases of a 3-phase power supply (e.g., 3-phase power supply 212 shown in FIG. 2).

Figure 4:
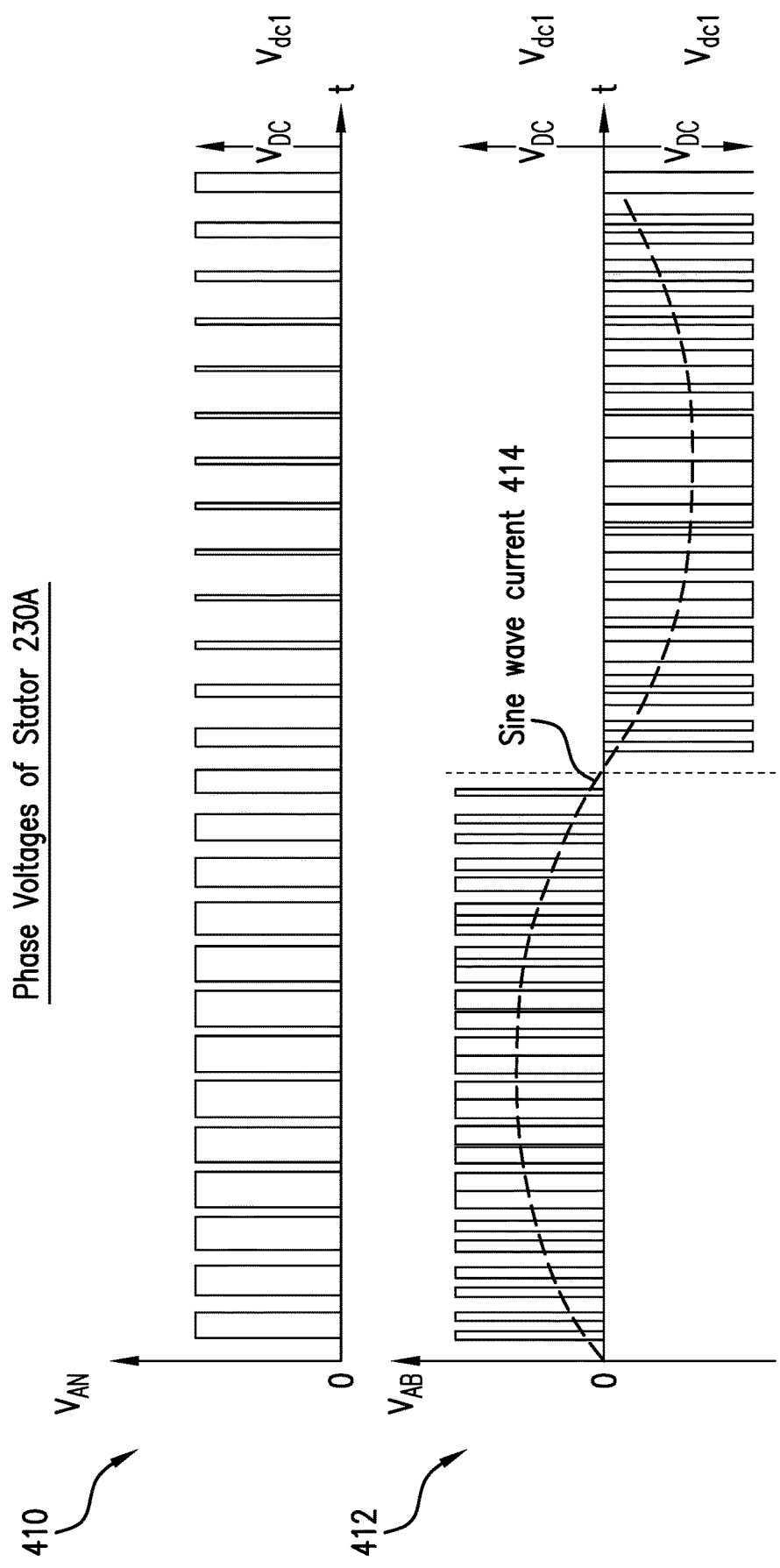
FIG. 4 is a simplified plot illustrating stator phase voltages in accordance with aspects of the disclosure.

FIG. 4 depicts plots 410, 412 that illustrate how phase voltages (e.g., 3-phase power supply 212 shown in FIG. 2) applied to the stator windings 230A are pulsed (e.g., using pulse width modulation (PWM) controlled by the controller 140) to change over time. Plot 410 illustrates how the voltage from Phase node A (a) to the neutral node (n) of the stator windings 230A are pulsed over time such that Vdc1 is a peak value of the pulses shown at plot 410. Plot 412 illustrates how the voltage from Phase node A (a) to the Phase node B (b) of the stator windings 230A are pulsed over time such that Vdc1 is a peak value of the pulses shown at plot 412. The pulses shown at plot 412 illustrate how the pulses produce a sine wave current in the phases of the stator windings 230A. As previously noted herein, because Vdc1 has a value that does not exceed a maximum voltage rating of the insulation systems of the stator 230, 230A, existing stator designs and associated insulation system designs can be used to process Vdc1.

Figure 5A:
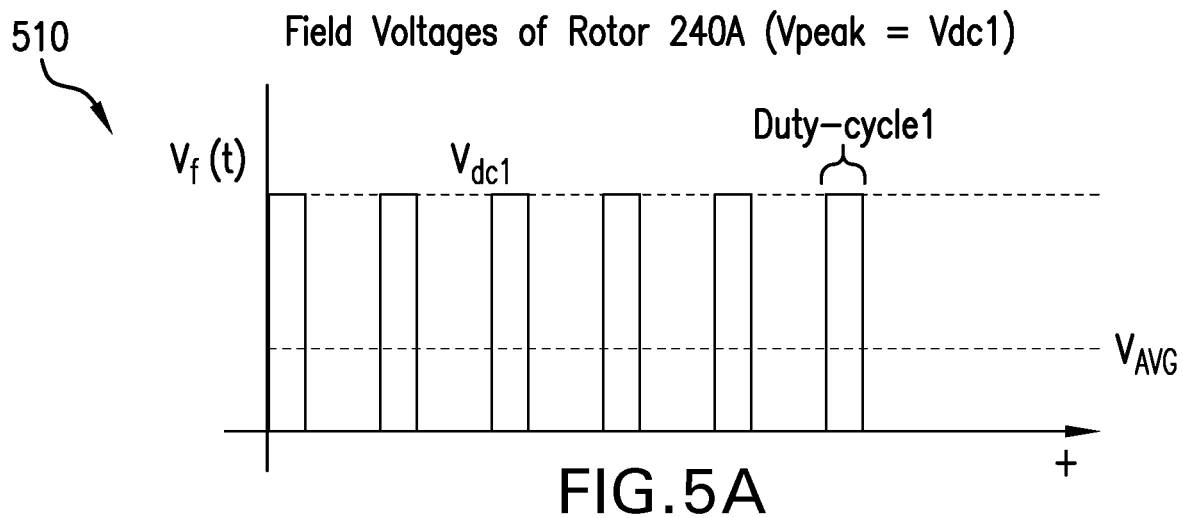
FIG. 5A is a simplified plot illustrating high rotor field voltages over time without benefit of aspects of the disclosure.

However, as also previously noted herein, because that same value of Vdc1 applied to the stator windings 230A exceeds a maximum voltage rating of the insulation system of the rotor 240, 240A, existing rotor designs and associated insulation system designs cannot be effectively used to process Vdc1 without significantly increasing the chances of incurring unwanted shorts due to carbon tracking, and without increasing the rotor design requirements for countering creepage and providing the necessary clearances. FIG. 5A depicts a plot 510 of a pulsed train of field voltages ($V_f(t)$) generated by Converter 2 (acting without benefit of Converter 1) from Vdc1 such that Vdc1 is the peak voltage of the pulse train. The pulse train in plot 510 has a controllable Duty-cycle1 and a controllable average voltage (Vavg) over time. The pulse train in plot 510 is applied over time to the rotor (or rotor windings) 240A. However, because Vdc1 exceeds a maximum voltage rating of the insulation system of the rotor 240, 240A, existing rotor designs and associated insulation system designs cannot be effectively used to process Vdc1 without significantly increasing the chances of incurring unwanted shorts due to carbon tracking, and without increasing the rotor design requirements for countering creepage and providing the necessary clearances.

Figure 5B:
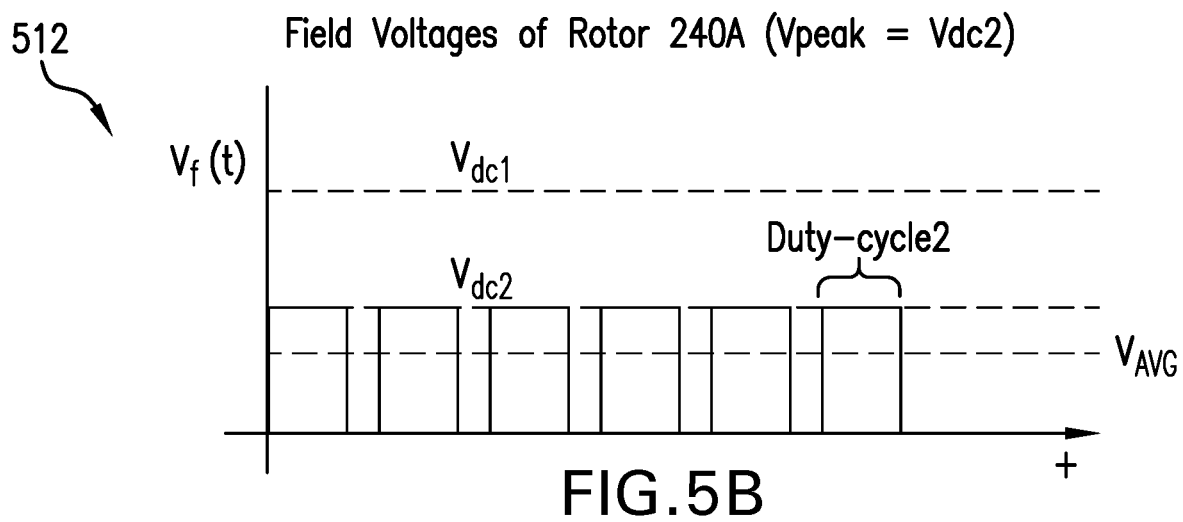
FIG. 5B is a simplified plot illustrating rotor field voltages over time in accordance with aspects of the disclosure.

In contrast, FIG. 5B depicts a plot 512 of a pulsed train of field voltages ($V_f(t)$) generated by Converter 2 acting with benefit of Converter 1. In accordance with embodiments of the disclosure, Converter 1 (e.g., a buck converter) can be implemented to include step-down circuitry that converts from Vdc1 to Vdc2 (Vdc2 <Vdc1) and provides Vdc2 to Converter 2. Vdc2 is selected such that it does not exceed a maximum voltage rating of the insulation system of the rotor 240, 240A, which allows existing rotor designs and associated insulation system designs to be effectively used to process Vdc2 without significantly increasing the chances of incurring unwanted shorts due to carbon tracking, and without increasing the rotor design requirements for countering creepage and providing the necessary clearances. Vdc2 is the peak voltage of the pulse train. The pulse train in plot 512 has a controllable Duty-cycle2 and a controllable average voltage (Vavg) over time. The pulse train in plot 512 is applied over time to the rotor (or rotor windings) 240A. Although the peak voltage, Vdc2, shown in plot 512 is less than the peak voltage, Vdc1, shown in plot 510, Duty-cycle2 in plot 512 can be controlled (e.g., by Controller 2 working in tandem with the controller 140) to provide the Vavg needed by the rotor 240A, which can be the same Vavg in plot 510.

Figure 3B:
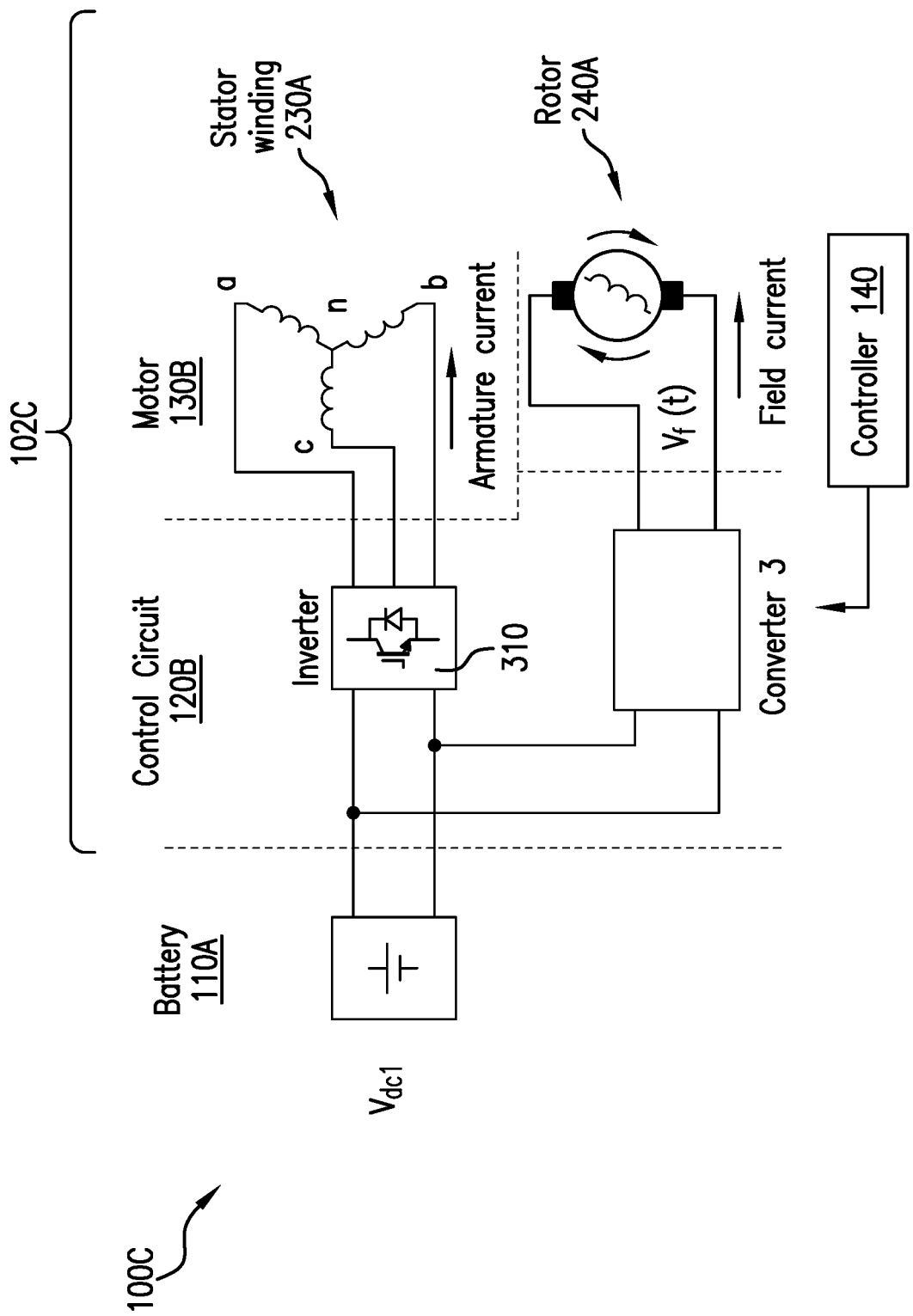
FIG. 3B is a simplified block diagram illustrating a non-limiting example of an electric drive motor system in accordance with aspects of the disclosure.

FIG. 3B depicts a system 100C embodying aspects of the disclosure. The system 100C represents a more detailed example of how the systems 100, 100A, 100B (shown in FIGS. 1, 2 and 3A) can be implemented in accordance with aspects of the disclosure. The system 100C is substantially identical to the system 100B except the previously-described functionality of Converter 1 and Converter 2 has been combined into a single unit Converter 3. In some embodiments of the disclosure, Converter 3 can also be configured to implement embodiments of the disclosure where, instead of stepping down the output voltage from the battery 110A, the desired Vdc2 shown in FIG. 5B can be accessed by accessing specific cells of the battery 110A instead of all of the cells of the battery 110A.

Figure 6:
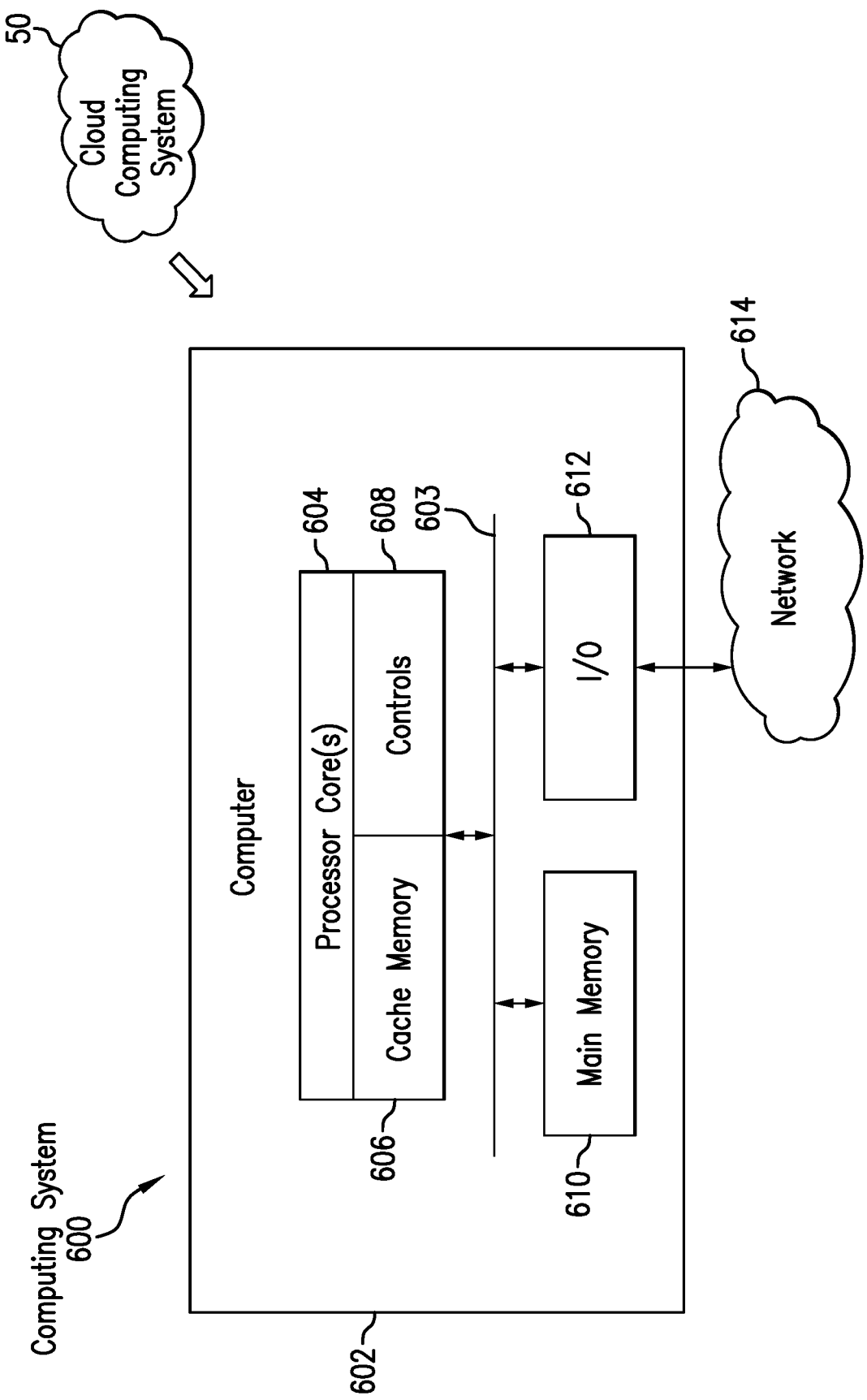
FIG. 6 is a simplified block diagram illustrating a computer system operable to implement embodiments of the disclosure.

FIG. 6 illustrates an example of a computer system 600 that can be used to implement the computer-based components in accordance with aspects of the disclosure. The computer system 600 includes an exemplary computing device ("computer") 602 configured for performing various aspects of the content-based semantic monitoring operations described herein in accordance aspects of the disclosure. In addition to computer 602, exemplary computer system 600 includes network 614, which connects computer 602 to additional systems (not depicted) and can include one or more wide area networks (WANs) and/or local area networks (LANs) such as the Internet, intranet(s), and/or wireless communication network(s). Computer 602 and additional system are in communication via network 614, e.g., to communicate data between them.

Exemplary computer 602 includes processor cores 604, main memory ("memory") 610, and input/output component(s) 612, which are in communication via bus 603. Processor cores 604 includes cache memory ("cache") 606 and controls 608, which include branch prediction structures and associated search, hit, detect and update logic, which will be described in more detail below. Cache 606 can include multiple cache levels (not depicted) that are on or off-chip from processor 604. Memory 610 can include various data stored therein, e.g., instructions, software, routines, etc., which, e.g., can be transferred to/from cache 606 by controls 608 for execution by processor 604. Input/output component (s) 612 can include one or more components that facilitate local and/or remote input/output operations to/from computer 602, such as a display, keyboard, modem, network adapter, etc. (not depicted).

A cloud computing system 50 is in wired or wireless electronic communication with the computer system 600. The cloud computing system 50 can supplement, support or replace some or all of the functionality (in any combination) of the computer system 600. Additionally, some or all of the functionality of the computer system 600 can be implemented as a node of the cloud computing system 50.

Many of the functional units of the systems described in this specification have been labeled as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components/modules/models of the systems illustrated herein are depicted separately for ease of illustration and explanation. In embodiments of the disclosure, the functions performed by the various components/modules/models can be distributed differently than shown without departing from the scope of the various embodiments of the disclosure describe herein unless it is specifically stated otherwise.

Various embodiments of the disclosure are described herein with reference to the related drawings. Alternative embodiments of the disclosure can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% of a given value.

Aspects of the disclosure can be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the claims.

What is claimed is:

1. A control circuit operable to control voltage delivery to a multi-component load, wherein:
   the control circuit is electronically coupled to a first component of the multi-component load;
   the control circuit is further electronically coupled to a second component of the multi-component load;
   the control circuit is operable to, responsive to an output voltage of a source, generate a second component voltage and provide the second component voltage to the second component of the multi-component load; and
   a peak value of the second component voltage is less than the output voltage.

2. The control circuit of claim 1, wherein:
   the control circuit comprises a first control circuit stage and a second control circuit stage;
   the first control circuit stage is operable to, responsive to the output voltage from the source, generate a first component voltage and provide the first component voltage to the first component of the multi-component load; and
   the second control circuit stage is operable to, responsive to the output voltage of the source, generate the second component voltage and provide the second component voltage to the second component of the multi-component load;
   wherein the peak value of the second component voltage is less than a peak value of the first component voltage.

3. The control circuit of claim 2, wherein the peak value of the second component voltage does not exceed a maximum peak voltage rating of an insulation system of the second component of the multi-component load.

4. The control circuit of claim 2, wherein the first control circuit stage comprises an inverter circuit.

5. The control circuit of claim 4, wherein the second control circuit stage comprises a voltage step-down circuit.

6. The control circuit of claim 5, wherein the second control circuit stage further comprises a direct-current-to-direct-current (DC-DC) converter circuit.

7. The control circuit of claim 1, wherein the source comprises an energy source.

8. The control circuit of claim 2, wherein the source comprises an energy source.

9. The control circuit of claim 2 wherein:
   the first component voltage comprise a pulsed first component voltage; and
   the second component voltage comprises a pulsed second component voltage.

10. The control circuit of claim 9, wherein:
    a duty cycle of the pulsed first component voltage provides a first component average voltage applied to the first component of the multi-component load; and
    a duty cycle of the pulsed second component voltage provides a second component average voltage applied to the second component of the multi-component load.

11. The control circuit of claim 10, wherein:
    the multi-component load comprises a motor;
    the first component comprises a stator of the motor; and
    the second component comprises a rotor of the motor.

12. A control circuit operable to control voltage delivery to a motor, the control circuit comprising:
    a first control circuit stage operable to generate a first pulsed voltage and provide the first pulsed voltage to a stator component of the motor; and
    a second control circuit stage operable to generate a second pulsed voltage and provide the second pulsed voltage to a brush excitation system of a rotor component of the motor;
    wherein a peak value of the second pulsed voltage is less than a peak value of the first pulsed voltage;
    wherein the peak value of the second pulsed voltage does not exceed a maximum peak voltage rating of an insulation system of the brush excitation system of the rotor component of the motor.

13. The control circuit of claim 12, wherein:
    the first control circuit stage comprises an inverter circuit;
    the second control circuit stage comprises a voltage step-down circuit and a direct-current-to-direct-current (DC-DC) converter circuit.

14. The control circuit of claim 13, wherein:
    the first control circuit stage is operable to, responsive to receiving an output voltage of an energy source, generate the first voltage; and
    the second control circuit stage is operable to, responsive to receiving the output voltage of the energy source, generate the second voltage.

15. The control circuit of claim 13, wherein:
    the first control circuit stage is operable to, responsive to receiving a first output voltage of an energy source, generate the first voltage; and
    the second control circuit stage is operable to, responsive to receiving a second output voltage of the energy source, generate the second voltage.

16. The control circuit of claim 12 wherein:
    a duty cycle of the pulsed first voltage provides a first average voltage applied to the stator component of the motor; and
    a duty cycle of the pulsed second voltage proves a second average voltage applied to the brush excitation system of the rotor component of the motor.

17. A method of making a control circuit operable to control voltage delivery to a multi-component load, the method comprising:
    forming a first control circuit stage operable to generate a first voltage and provide the first voltage to a first component of the multi-component load; and
    forming a second control circuit stage operable to generate a second voltage and provide the second voltage to a second component of the multi-component load;
    wherein a peak value of the second voltage is less than a peak value of the first voltage.

18. The method of claim 17, wherein the peak value of the second voltage does not exceed a maximum peak voltage rating of an insulation system of the second component of the multi-component load.

19. The method of claim 17, wherein the first control circuit stage comprises an inverter circuit.

20. The method of claim 19, wherein the second control circuit stage comprises a voltage step-down circuit.

* * * * *